(12) United States Patent
Stevens et al.

(10) Patent No.: US 10,160,893 B2
(45) Date of Patent: Dec. 25, 2018

(54) CHEMICALLY FOAMED POLYSULFIDE SEALANT FOR AEROSPACE FUEL TANK USE

(71) Applicant: THE BOEING COMPANY, Chicago, IL (US)

(72) Inventors: Barton E. Stevens, Ladson, SC (US); Brandon D. Booth, Mt. Pleasant, SC (US); Andrew M. Zweig, Ellisville, MO (US)

(73) Assignee: THE BOEING COMPANY, Chicago, IL (US)

( * ) Notice: Subject to any disclaimer, the term of this patent is extended or adjusted under 35 U.S.C. 154(b) by 127 days.

(21) Appl. No.: 15/195,141

(22) Filed: Jun. 28, 2016

(65) Prior Publication Data

US 2017/0369752 A1 Dec. 28, 2017

(51) Int. Cl.
| | |
|---|---|
| *C08J 9/06* | (2006.01) |
| *C08K 3/26* | (2006.01) |
| *C09K 3/10* | (2006.01) |
| *C08G 75/14* | (2006.01) |
| *C08L 81/04* | (2006.01) |
| *C09J 181/04* | (2006.01) |

(52) U.S. Cl.
CPC .......... *C09K 3/1012* (2013.01); *C08G 75/14* (2013.01); *C08J 9/06* (2013.01); *C08L 81/04* (2013.01); *C09J 181/04* (2013.01); *C08J 2207/02* (2013.01); *C08J 2381/04* (2013.01); *C08K 2003/262* (2013.01); *C09K 2003/1087* (2013.01)

(58) Field of Classification Search
CPC . C08J 9/06; C08J 9/224; C08J 2461/28; C08J 2381/02; C08J 2207/02; C08J 2381/04; C09K 3/1012; C09K 2003/1087; C09K 2003/262
See application file for complete search history.

(56) References Cited

U.S. PATENT DOCUMENTS

| | | | |
|---|---|---|---|
| 2,466,963 A | 4/1949 | Patrick et al. | |
| 4,104,427 A * | 8/1978 | Nolte | B32B 17/10311 428/68 |
| 2006/0160932 A1* | 7/2006 | Taylor | C08G 59/685 523/458 |
| 2009/0236025 A1 | 9/2009 | Burkus et al. | |
| 2009/0239014 A1 | 9/2009 | Noguchi et al. | |

FOREIGN PATENT DOCUMENTS

| | | |
|---|---|---|
| CN | 104910493 A | 9/2015 |
| EP | 1088836 A1 | 4/2001 |
| EP | 1205524 A2 | 5/2002 |
| JP | H11279528 A | 10/1999 |
| JP | 2001081442 A | 3/2001 |

OTHER PUBLICATIONS

Hirose et al. (JP 2009084469, Derwent 2009-H35366), 2009.*
Brian C. Ennis, Peter J. Hanhela, Robert H.E. Huang, Geoffrey J. Long, and D. Brenton Paul; article entitled General Procedures to Determine the Composition of Commercial, Two-Part Polysulfide Aircraft Sealants; Journal of Applied Polymer Science, vol. 41, 2387-2856 (1990).
Extended European Search Report for Application No. EP 17178227.9 dated Nov. 7, 2017.

* cited by examiner

*Primary Examiner* — Shane Fang

(74) *Attorney, Agent, or Firm* — Coats & Bennett, PLLC

(57) ABSTRACT

The present application is directed to polysulfide sealant formulations, application of such sealants, and methods for reducing the density of polysulfide sealant formulations.

22 Claims, 6 Drawing Sheets

CHEMICALLY FOAMED POLYSULFIDE SEALANT FOR AEROSPACE FUEL TANK USE

TECHNOLOGICAL FIELD

The present disclosure generally relates to the field of sealants. More particularly, the present disclosure relates to sealants applied to substrates in enclosed environments including, without limitation, substrates used in the manufacture of fuel tanks for aerospace vehicles.

BACKGROUND

Various compounds are used as sealants to achieve seals at conjoined substrate surfaces. Such surfaces requiring sealants can exist in the interior of the aircraft and include, for example, areas within an aircraft or spacecraft wing, including, without limitation, the fasteners on the interior of fuel tanks. Such sealant materials comprise various characteristics beneficial to their contemplated end use. With respect to the use of sealants on aircraft and spacecraft, additional characteristics come into play, including, for example, the overall weight that sealants may add to an aircraft. Such additional weight can impact fuel consumption, aircraft performance, effective range, cost, etc.

Many sealant formation processes in the aerospace industry implement polysulfide sealants that undergo a gas-forming chemical reaction to expand and otherwise "foam" the sealant. Efforts to foam such sealants have used hydrides in combination with polysulfide compounds. However, the hydrogen gas that is liberated from the reaction is dangerous from an explosion and/or toxicity risk, especially in an enclosed environment where many sealing operations occur.

Polysulfide polymers in liquid form are viscous fluids than can be converted to solid form at room temperature with the addition of curing agents. When blowing agents are added to the polysulfide polymers and the curing agent, a cellular "foamed" rubber product results. Liquid polysulfide polymers are cured by converting the thiol terminal group to create disulfide bonds that link short chain segments of the liquid polymer to long chain segments resulting in a cured polymer with elastomeric properties. Lead peroxide and cumene hydroperoxide have been suggested as useful curatives for polysulfide reactions. However, the toxicity of the reaction byproducts remains a concern.

Efforts have been made to reduce the amounts of sealants used in aircraft manufacturing. Some efforts have focused on the reduction of the density of sealants used in the production and manufacture of aircraft and spacecraft. For example, known methods for reducing sealant density include introducing micro-structures, such as microballoons, to the sealant formulation. The thin-walled micro-structures may or may not be air-filled. Such structures, when introduced into the sealant formulation reduce the density of sealants. In essence, the presence of the micro-structures in the sealant formulation increases the overall volume of the sealant while keeping the weight of the sealant applied in such volume substantially constant. The introduction of physical micro-structures has, however, proven problematic as micro-structures can be susceptible to collapse or rupture when ambient pressure is varied such as, for example, the pressure changes prevalent during flight, especially high altitude flight.

BRIEF SUMMARY

The present disclosure relates to low density sealant formations comprising polysulfide, an acid salt and a bicarbonate.

In a further aspect, the acid salt comprises sodium aluminum sulfate, monocalcium phosphate, delta-gluconolactone; sodium acid pyrophosphate; sodium aluminum phosphate; sodium aluminum pyrophosphate; or potassium bitartrate.

In a further aspect, the acid salt in the sealant formulation comprises sodium aluminum sulfate.

In another aspect, the acid salt in the sealant formulation comprises monocalcium phosphate.

In a further aspect, the bicarbonate in the sealant formulation comprises a sodium bicarbonate; potassium bicarbonate or ammonium bicarbonate.

In yet another aspect, the bicarbonate in the sealant formulation comprises sodium bicarbonate.

In another embodiment, the polysulfide comprises one or more disulfide linkages and the polysulfide ranges in molecular weight from about 1100 to about 8000, and has a crosslinking density ranging from about 0.2 to about 5 mol %.

The polysulfide in the formulations according to aspects of the present disclosure comprises polymers made from monomers including without limitation, 1,3-dichloropropane (CASRN 142-28-9); 1,3-dibromopropane (CASRN 109-64-8); 1,2-dichloropropane (CASRN 78-87-5); 1,4-dichlorobutane (CASRN 110-56-5); 1,4-dibromobutane (CASRN 110-52-1); trans-1,4-dibromo-2-butene (CASRN 821-06-7); 1,3-dichlorobutane (CASRN 1190-22-3); 1,2-dichlorobutane (CASRN 616-21-7); 1,2-dibromobutane (CASRN 533-98-2); 2,3-dichlorobutane (CASRN 7581-97-7); 2,3-dibromobutane (CASRN 5408-86-6); 1,5-dichloropentane (CASRN 628-76-2); 1,5-dibromopentane (CASRN 111-24-0); 1,4-dichloropentane (CASRN 626-92-6); 1,4-dibromopentane (CASRN 626-87-9); 1,3-dichloropentane (CASRN 1190-22-3); 1,2-dichloropentane (CASRN 1674-33-5); 2,3-dichloropentane CASRN 600-11-3); 2,4-dichloropentane (CASRN 625-67-2); 1,6-dichlorohexane (CASRN 2163-00-0); 1,6-dibromohexane (CASRN 629-03-8); 1,2-dichlorohexane (CASRN 2162-92-7); 1,2-dichlorocyclohexane (CASRN 1121-21-7) and 1,2-dichlorocyclohexane cis and trans isomers; 1,3-dichlorocyclohexane (55887-78-0) and 1,3-dichlorocyclohexane cis and trans isomers; 1,4-dichlorocyclohexane (19398-57-3) and 1,4-dichlorocyclohexane cis and trans isomers; 1,2-bis(chloromethyl)cyclohexane (CASRN 41098-73-1) and 1,2-bis(chloromethyl)cyclohexane cis and trans isomers; 1,1-bis(chloromethyl)cyclohexane (CASRN 1378688-55-1) and 1,1-bis(chloromethyl)cyclohexane cis and trans isomers; 1,4-bis(chloromethyl)cyclohexane (CASRN 824-93-1) and 1,4-bis(chloromethyl)cyclohexane cis and trans isomers; 1,2-bis(chloromethyl)benzene (CASRN 612-12-4); 1,2,3-trichloropropane (CASRN 96-18-4); 1,2,3-tribromopropane (CASRN 96-11-7); or combinations thereof.

A further aspect contemplates a cured sealant made from a formulation comprising a polysulfide, an acid salt, and a bicarbonate.

Another aspect contemplates a sealant formulation comprising a polysulfide, a sodium aluminum sulfate and sodium bicarbonate.

A further aspect contemplates a sealant formulation comprising a polysulfide, monocalcium phosphate and sodium bicarbonate.

A further aspect is directed to a cured sealant formulation comprising a polysulfide, an acid salt, and a bicarbonate, wherein the cured sealant has a density ranging from about 0.6 g/cm$^3$ to about 1.0 g/cm$^3$.

In a further aspect, the polysulfide, the acid salt and the bicarbonate are combined in predetermined amounts.

Another aspect is directed to a sealant formulation comprising an amount of polysulfide ranging from about 75 to about 90 weight %; an amount of acid salt ranging from about 3 to about 10 weight %; and an amount of bicarbonate ranging from about 2.5 to about 10 weight %.

A further aspect is directed to a sealant formulation comprising an amount of polysulfide ranging from about 75 to about 90 weight %; an amount of sodium aluminum sulfate or an amount of monocalcium phosphate ranging from about 3 to about 10 weight %; and an amount of sodium bicarbonate ranging from about 2.5 to about 10 weight %, and aqueous media in an amount ranging from about 1 to about 5 weight %.

A further aspect contemplates a component comprising a cured sealant made from a formulation comprising a polysulfide, an acid salt, and a bicarbonate.

Yet another aspect contemplates a vehicle comprising a cured sealant made from a formulation comprising a polysulfide, an acid salt and a bicarbonate.

In another aspect, the vehicle is a manned aircraft, an unmanned aircraft, a manned spacecraft, an unmanned spacecraft, a manned rotorcraft, an unmanned rotorcraft, a manned satellite, an unmanned satellite, a manned terrestrial vehicle, an unmanned terrestrial vehicle, a manned surface marine vehicle, an unmanned surface marine vehicle, a manned sub-surface marine vehicle, an unmanned sub-surface marine vehicle, and combinations thereof.

A further aspect of the present disclosure is directed to a method of manufacturing a polysulfide-containing sealant formulation comprising combining a polysulfide with an acid salt and bicarbonate to form a first mixture.

In a further aspect, in the step of combining the polysulfide with an acid salt and bicarbonate to form a first mixture, the acid salt comprises sodium aluminum sulfate, monocalcium phosphate, delta-gluconolactone; sodium acid pyrophosphate; sodium aluminum phosphate; sodium aluminum pyrophosphate; or potassium bitartrate.

In a further aspect, in the step of combining the polysulfide with an acid salt and bicarbonate to form a first mixture, the acid salt in the sealant formulation comprises sodium aluminum sulfate or monocalcium phosphate.

In yet another aspect, in the step of combining the polysulfide with an acid salt and bicarbonate to form a first mixture, the bicarbonate in the sealant formulation comprises sodium bicarbonate; potassium bicarbonate or ammonium bicarbonate.

Another aspect of the present disclosure is directed to a method of manufacturing a polysulfide-containing sealant formulation comprising combining a polysulfide with an acid salt and bicarbonate to form a first mixture, wherein, in the step of combining the a polysulfide with an acid salt and bicarbonate to form a first mixture, polysulfide in the formulations according to aspects of the present disclosure comprises polymers made from monomers including without limitation, 1,3-dichloropropane (CASRN 142-28-9); 1,3-dibromopropane (CASRN 109-64-8); 1,2-dichloropropane (CASRN 78-87-5); 1,4-dichlorobutane (CASRN 110-56-5); 1,4-dibromobutane (CASRN 110-52-1); trans-1,4-dibromo-2-butene (CASRN 821-06-7); 1,3-dichlorobutane (CASRN 1190-22-3); 1,2-dichlorobutane (CASRN 616-21-7); 1,2-dibromobutane (CASRN 533-98-2); 2,3-dichlorobutane (CASRN 7581-97-7); 2,3-dibromobutane (CASRN 5408-86-6); 1,5-dichloropentane (CASRN 628-76-2); 1,5-dibromopentane (CASRN 111-24-0); 1,4-dichloropentane (CASRN 626-92-6); 1,4-dibromopentane (CASRN 626-87-9); 1,3-dichloropentane (CASRN 1190-22-3); 1,2-dichloropentane (CASRN 1674-33-5); 2,3-dichloropentane CASRN 600-11-3); 2,4-dichloropentane (CASRN 625-67-2); 1,6-dichlorohexane (CASRN 2163-00-0); 1,6-dibromohexane (CASRN 629-03-8); 1,2-dichlorohexane (CASRN 2162-92-7); 1,2-dichlorocyclohexane (CASRN 1121-21-7) and 1,2-dichlorocyclohexane cis and trans isomers; 1,3-dichlorocyclohexane (55887-78-0) and 1,3-dichlorocyclohexane cis and trans isomers; 1,4-dichlorocyclohexane (19398-57-3) and 1,4-dichlorocyclohexane cis and trans isomers; 1,2-bis(chloromethyl)cyclohexane (CASRN 41098-73-1) and 1,2-bis(chloromethyl)cyclohexane cis and trans isomers; 1,1-bis(chloromethyl)cyclohexane (CASRN 1378688-55-1) and 1,1-bis(chloromethyl)cyclohexane cis and trans isomers; 1,4-bis(chloromethyl)cyclo-hexane (CASRN 824-93-1) and 1,4-bis(chloromethyl)cyclohexane cis and trans isomers; 1,2-bis(chloromethyl)benzene (CASRN 612-12-4); 1,2,3-trichloropropane (CASRN 96-18-4); 1,2,3-tribromopropane (CASRN 96-11-7); or combinations thereof.

In another aspect, in the step of combining the a polysulfide with an acid salt and bicarbonate to form a first mixture, the sealant formulation comprises an amount of polysulfide ranging from about 75 to about 90 weight %; an amount of acid salt ranging from about 3 to about 10 weight %; and an amount of bicarbonate ranging from about 2.5 to about 10 weight %.

In a further aspect, in the step of combining the a polysulfide with an acid salt and bicarbonate to form a first mixture, the sealant formulation comprises an amount of polysulfide ranging from about 75 to about 90 weight %; an amount of sodium aluminum sulfate or an amount of monocalcium phosphate ranging from about 3 to about 10 weight %; and an amount of sodium bicarbonate, potassium bicarbonate or ammonium bicarbonate ranging from about 2.5 to about 10 weight %.

Still another aspect contemplates, in a further step, adding a predetermined amount of aqueous media to the first mixture to form a second mixture.

According to a further aspect, in the step of adding a predetermined amount of aqueous media to the first mixture to form a second mixture, aqueous media is added in an amount ranging from about 1 to about 5 weight %.

In a still further aspect of the present disclosure, after the step of forming the first mixture, the first mixture is mixed in a centrifugal mixer at predetermined and varying RPMs for predetermined durations.

In yet another aspect, after forming the second mixture, further comprising mixing the second mixture in a centrifugal mixer at predetermined and varying RPMs for predetermined durations.

In a further aspect, after the step of forming the second mixture, the second mixture is cured.

According to a further aspect, after the step of forming the second mixture, the second mixture is then cured, and wherein the cured second mixture comprises a density ranging from about 0.6 g/cm$^3$ to about 1.0 g/cm$^3$.

In another aspect, in the step of curing the second mixture, the curing comprises a temperature ranging from about 120° F. to about 145° F. for about 12 hours.

In another aspect, in the step of curing the second mixture, the curing comprises a temperature ranging from about 70° F. to about 100° F.

BRIEF DESCRIPTION OF THE DRAWINGS

Figure 1:
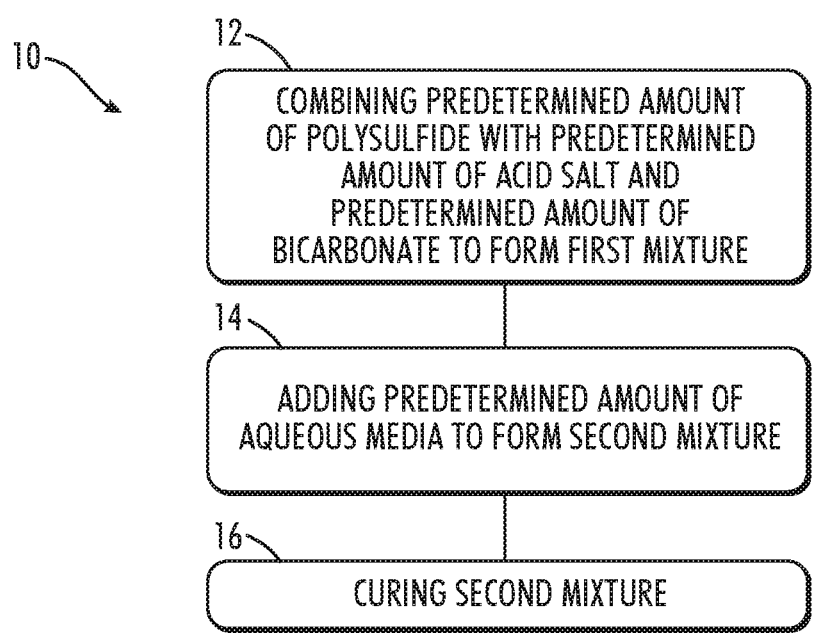

Having thus described variations of the disclosure in general terms, reference will now be made to the accompanying drawings, which are not necessarily drawn to scale, and wherein:

FIGS. 1-6 are flowcharts outlining aspects of the present disclosure.

DETAILED DESCRIPTION

Aspects of the present disclosure are directed to methods, systems and apparatuses for the manufacture, use and application of low density polysulfide sealant formulations. In particular, aspects of the present disclosure are directed to low density polysulfide-containing sealant formulations that comprise a bicarbonate compound and an acid salt compound.

As used herein, the term "sealant composition" refers to a composition that, when applied to an aperture (such as the joint or space formed by the interface between two parts), has the ability to resist atmospheric conditions, such as moisture and temperature, and at least partially block the transmission of materials, such as water, fuel, and/or other liquids and gases, which might otherwise occur at the aperture. Sealant compositions, therefore, are often applied to a peripheral edge surface of a component part, or to openings manufactured in parts (e.g. openings through which fittings are passed and secured in place) for the purpose of hindering material transport to, from, or through such a part. Sealants often have adhesive properties, but are not simply adhesives that do not have the blocking properties of a sealant.

The term "polysulfide" as used in this disclosure includes polysulfide-containing compounds. Particularly useful polysulfides for use in the sealant formulations of the present disclosure are liquid polysulfides that are viscous, thermosetting (e.g. crosslinking) polysulfide resin materials based on resins that are thiol-terminated and curable, for example, through an oxidative reaction using, for example inorganic oxides, inorganic peroxides, organic peroxides and the like.

In another aspect, the term "polysulfide" refers to a polymer that contains one or more disulfide linkages, i.e., —[S—S]— linkages, in the polymer backbone and/or in the terminal or pendant positions on the polymer chain. Often, the polysulfide polymer will have two or more sulfur-sulfur linkages. Suitable polysulfides include, for example, those that are commercially available from Akzo Nobel; under the name THIOPLAST. THIOPLAST products are available in a wide range of molecular weights ranging, for example, from less than 1100 to over 8000, with molecular weight in grams per mole. In some cases, the polysulfide has a number average molecular weight of 1,000 to 4,000. The crosslink density of these products also varies, depending on the amount of crosslinking agent, such as trichloropropane, used. For example, crosslink densities often range from 0 to 5 mol %, such as from about 0.2 to about 5 mol %. The "—SH" content, (i.e. mercaptan content), of these products can also vary. The mercaptan content and molecular weight of the polysulfide can affect the cure speed of the polymer, with cure speed increasing with molecular weight. Suitable polysulfides are also disclosed in U.S. Pat. No. 2,466,963, the entire contents of which being incorporated herein by reference.

Contemplated polysulfides for use as components in the formulations according to the present disclosure comprise polymers made from monomers such as, without limitation, 1,3-dichloropropane (CASRN 142-28-9); 1,3-dibromopropane (CASRN 109-64-8); 1,2-dichloropropane (CASRN 78-87-5); 1,4-dichlorobutane (CASRN 110-56-5); 1,4-dibromobutane (CASRN 110-52-1); trans-1,4-dibromo-2-butene (CASRN 821-06-7); 1,3-dichlorobutane (CASRN 1190-22-3); 1,2-dichlorobutane (CASRN 616-21-7); 1,2-dibromobutane (CASRN 533-98-2); 2,3-dichlorobutane (CASRN 7581-97-7); 2,3-dibromobutane (CASRN 5408-86-6); 1,5-dichloropentane (CASRN 628-76-2); 1,5-dibromopentane (CASRN 111-24-0); 1,4-dichloropentane (CASRN 626-92-6); 1,4-dibromopentane (CASRN 626-87-9); 1,3-dichloropentane (CASRN 1190-22-3); 1,2-dichloropentane (CASRN 1674-33-5); 2,3-dichloropentane CASRN 600-11-3); 2,4-dichloropentane (CASRN 625-67-2); 1,6-dichlorohexane (CASRN 2163-00-0); 1,6-dibromohexane (CASRN 629-03-8); 1,2-dichlorohexane (CASRN 2162-92-7); 1,2-dichlorocyclohexane (CASRN 1121-21-7) and 1,2-dichlorocyclohexane cis and trans isomers; 1,3-dichlorocyclohexane (55887-78-0) and 1,3-dichlorocyclohexane cis and trans isomers; 1,4-dichlorocyclohexane (19398-57-3) and 1,4-dichlorocyclohexane cis and trans isomers; 1,2-bis(chloromethyl)cyclohexane (CASRN 41098-73-1) and 1,2-bis(chloromethyl)cyclohexane cis and trans isomers; 1,1-bis(chloromethyl)cyclo-hexane (CASRN 1378688-55-1) and 1,1-bis(chloromethyl)cyclohexane cis and trans isomers; 1,4-bis(chloromethyl)cyclohexane (CASRN 824-93-1) and 1,4-bis(chloromethyl)cyclohexane cis and trans isomers; 1,2-bis(chloromethyl)benzene (CASRN 612-12-4); 1,2,3-trichloropropane (CASRN 96-18-4); 1,2,3-tribromopropane (CASRN 96-11-7); ethane,1,1'-thiobis[2-[(2-chloroethyl)thio]- (CASRN 51472-73-2); ethane,1,1'-oxybis[2-chloro]- (CASRN 111-44-4); and sodium sulfide, $Na_2S$ (CASRN 1313-82-2); sodium polysulfide (CASRN 1344-08-7); and elemental sulfur (CASRN 7704-34-9) for difunctional polysulfides and combinations thereof.

Presently contemplated polysulfide sealant polymers can be prepared by the reaction of suitable dihalide monomers, such as those listed above. The mixture is heated and stirred at reflux for 1-2 hours to achieve the $S_{N2}$ substitution reaction in which all of the chlorides are displaced by thiols or sulfides. The resulting mixture is cooled to 25° C., the polymer is separated, and washed with water to give a high molecular weight resin. Reductive cleavage is useful to render lower molecular weight resins (molecular weight of 2000 to 7000) useful for preparing sealant and adhesive materials, and is accomplished by treating the material with aqueous sodium hydro sulfide, sodium sulfite, or sodium hydro sulfite (i.e. sodium bisulfite). Further washing to remove the salts produced provides formulations useful as sealants.

It is understood that the addition of a trihalide, such as 1,2,3-trichloropropane (CASRN 96-18-4) introduces branching and trifunctionality to some of the polymers, with the amount of trifunctional polymer being related to the mole fraction of trichloropropane relative to the mole fraction of the difunctional dichlorides mentioned above), and combinations thereof. The desired polymer will have thiol end groups. The sulfide ion, provided by sodium sulfide or a polysulfide, is a strong enough nucleophile to displace all terminal chlorides.

A CAS Registry Number, also referred to as CASRN or CAS Number, is a unique numerical identifier assigned by Chemical Abstract Service (CAS) to every chemical substance described in the open scientific literature (currently including those described from at least 1957 through the present), as would be readily understood by those skilled in the field.

In another aspect, useful polysulfide formulations are sold commercially under the tradenames Pro-Seal 890F A-2; Pro-Seal 870; PR-1776M; PR-1772; PR-1428; PR-1440, PR-1776M B-1/2 (PPG Aerospace, Mojave, Calif.); AC-770; AC-250; AC-251; (3M—Aerospace Sealants, Garden Grove, Calif.), etc. However, the present disclosure contemplates the use of any viscous, thermosetting polysulfide material that is thiol-terminated and able to be reacted and cured to form a rubber-like material. It is understood that, for the purpose of this disclosure, the term "viscous, thermosetting polysulfide material" refers to those polysulfide materials having a viscosity ranging from about 100 to about 25,000 poise, for fully compounded polysulfide sealants. It is further understood that some of the commercially available polysulfide formulations listed above and used in the Examples below contain a curing agent and are otherwise provided in a refrigerated state.

For the purpose of this disclosure, the term "acid salt" includes acid-salt containing compounds and refers to the class of salts formed by the partial neutralization of diprotic or polyprotic acids. Alkali metal acid salts are particularly useful. Further, examples of acid salts include, without limitation, sodium hydrosulfide, sodium bisulfate, sodium aluminum sulfate, sodium aluminum phosphate, sodium aluminum pyrophosphate, monocalcium phosphate, disodium phosphate, sodium acid pyrophosphate, potassium bitartrate, delta-gluconolactone, etc., with sodium aluminum sulfate and monocalcium phosphate (also known as monocalcium phosphate) both showing particular utility for the formulations of the present disclosure, as shown in more detail below.

The term "bicarbonate" as used herein includes bicarbonate-containing compounds including, for example, sodium bicarbonate, potassium bicarbonate, ammonium bicarbonate. It has further now been determined that various monocarbonate-containing compounds can also be reacted to liberate amounts of $CO_2$ useful in reducing the density of the modified sealant compounds disclosed herein.

The term "aqueous media" includes compounds, the significant portion of which, are water-based, and also includes water, deionized water, distilled water, etc.

The present disclosure contemplates manufacturing a sealant, and the sealants so manufactured, comprising combining a polysulfide with an acid salt and bicarbonate to form a first mixture, with the sealant formulation comprising an amount of polysulfide (stock) ranging from about 75 to about 90 weight %; an amount of acid salt ranging from about 3 to about 10 weight %; and an amount of bicarbonate ranging from about 2.5 to about 10 weight %.

While not being bound to any particular theory, it is believed that the reactions required to foam and cure the sealant formulations of the present disclosure are assisted and/or initiated by adding a predetermined amount of aqueous media to the first mixture to form a second mixture. According to further aspects, aqueous media is added in an amount ranging from about 1.0 to about 5 weight %. The term "aqueous media" includes compounds, the significant portion of which, are water-based, including water, deionized water, distilled water, etc.

It is understood that the weight percentages of the various components set forth herein, such as, for example the polysulfide components, can comprise various fillers, buffers, and other compounds, etc. In the case where stock (e.g. commercially available) polysulfide sealant compounds are used as a starting material, it is understood that the weight percent of the polysulfide material reported herein (due to the inclusion of proprietary components, fillers, etc.) may range from about 75 to about 90 weight %.

When considering only the polysulfide polymer (without filler, buffer, and other compounds), the weight percentages of the polysulfide polymer alone are understood to be lower than the weight percentages stated throughout the present application, ranging from about 50 to about 70% by weight for some stock formulation, and for other stock formulations may not exceed 30 wt %. For example, the stock sealant PR-1776 (PPG Aerospace), useful as a starting component according to aspects of the present application, comprises an amount of polysulfide liquid of up to about 30 wt %; an amount of additional polysulfide polymers up to about 10 wt %; an amount of trichloropropane polymer of about 45 wt %; an amount of fillers, such as duramite and amorphous silica of up to about 40 wt %; an amount of titanium dioxide of about 5 wt %, an amount of ethyl acetate of about 5 wt %, etc.

Other known stock polysulfide components useful as starting materials according to aspects of the present disclosure comprise: polysulfide resins (about 65-70 wt %); fillers, for example, as calcium carbonate, silica, carbon, kaolin, montmorillonite, microballoons etc., (about 25 wt %); plasticizers, for example, m-terphenyls and non-hydrogenated terphenyls, etc. (about 5 wt %), adhesion additives, for example, as mixtures of mono-, di-, and tri-allyl-ethers of benzene and phenol-formaldehyde resin, trialkyloxysilane, epoxy resin, phenolic resins, titanates, etc. (about 2 wt %); curing agents, for example, as manganese dioxide supplemented by stearic acid or diphenylguanidine, etc. (about 3 wt %), etc. The components listed are not meant to be comprehensive listings, but are only illustrative examples. It is understood that additional compounds satisfying their intended use as fillers, plasticizers, adhesion additives and curing agents may also be used.

Example 1

The commercially available polysulfide component Pro-Seal 890F A-2 (PPG Aerospace) was removed from a freezer and thawed in a warm water bath for 10 minutes. The polysulfide component was then dispensed in a plastic cup and the sodium bicarbonate and acid salt (sodium aluminum sulfate, Table 1) were each weighed and mixed with the polysulfide compound in a centrifugal mixer for predetermined duration at predetermined varying RPMs (i.e. 15 seconds each at 800, 1400, 2000, and 2350 RPM). An aqueous media comprising deionized water was added to the mixture and the mixture was mixed again in a centrifugal mixer for predetermined duration at predetermined varying RPMs (i.e. 15 seconds each at 800, 1400 2000 and 2350 RPM). The sealant mixture was cured in the mix cup at an oven temp of 120° F. for 12 hours at atmospheric pressure.

Once fully cured, density measurements of both the stock polysulfide compound and the cured mixture (appearing as a foamed sealant material) were taken by cutting sections and measuring the volume, weighing, and taking the quotient of the quantities of the cut samples. The stock polysulfide compound was found to have a density of 1.46+/−0.04 g/cm$^3$. The mixture foamed with sodium aluminum sulfate was found to have a density of 0.75+/−0.04 g/cm$^3$.

TABLE 1

| Component | Wt % | Mass (in grams) |
|---|---|---|
| Polysulfide sealant-Pro-Seal 890F A-2 | 85.6 | 50 |
| Sodium bicarbonate | 4.5 | 2.63 |
| Sodium aluminum sulfate | 8.2 | 4.78 |
| Deionized water | 1.7 | 1 |

Example 2

The commercially available polysulfide component Pro-Seal 890F A-2 (PPG Aerospace) was removed from a freezer and thawed in a warm water bath for 10 minutes. The polysulfide component was then dispensed in a plastic cup and the sodium bicarbonate and acid salt (monocalcium phosphate, Table 2) were each weighed and mixed with the polysulfide compound in a centrifugal mixer for predetermined duration at predetermined varying RPMs (i.e. 15 seconds each at 800, 1400, 2000, and 2350 RPM). An aqueous media comprising deionized water was added to the mixture and the mixture was mixed again in a centrifugal mixer for predetermined duration at predetermined varying RPMs (i.e. 15 seconds each at 800, 1400 2000 and 2350 RPM). The sealant mixture was cured in the mix cup at an oven temp of 120° F. for 12 hours.

Once fully cured, density measurements of both the stock polysulfide compound and the cured mixture (appearing as a foamed sealant material) were taken by cutting sections and measuring the volume, weighing, and taking the quotient of the quantities of the cut samples. The stock polysulfide compound was found to have a density of 1.46+/−0.04 g/cm$^3$. The mixture foamed with monocalcium phosphate was found to have a density of 0.83+/−0.02 g/cm$^3$ (See Table 2).

TABLE 2

| Component | Wt % | Mass (in grams) |
|---|---|---|
| Polysulfide sealant - Pro-Seal 890F A-2 | 90.2 | 50 |
| Sodium bicarbonate | 4.7 | 2.63 |
| Monocalcium phosphate | 3.3 | 4.78 |
| Deionized water | 1.8 | 1 |

Example 3

The commercially available polysulfide component AC-770 (3M—Aerospace Sealants, Garden Grove, Calif.) are removed from a freezer and thawed in a warm water bath for 10 minutes. The polysulfide component is then dispensed in a plastic cup and the sodium bicarbonate and acid salt (sodium acid pyrophosphate, Table 3) are each weighed and mixed with the polysulfide compound in a centrifugal mixer for predetermined duration at predetermined varying RPMs (i.e. 15 seconds each at 800, 1400, 2000, and 2350 RPM). An aqueous media comprising deionized water is added to the mixture and the mixture is mixed again in a centrifugal mixer for predetermined duration at predetermined varying RPMs (i.e. 15 seconds each at 800, 1400 2000 and 2350 RPM). The sealant mixture is cured in the mix cup at an oven temp of 120° F. for 12 hours.

TABLE 3

| Component | Wt % | Mass (in grams) |
|---|---|---|
| Polysulfide sealant AC-770 | 85.6 | 40.6 |
| Sodium bicarbonate | 3.6 | 1.8 |
| Sodium acid pyrophosphate | 7.7 | 3.85 |
| Deionized water | 3.1 | 1.55 |

Examples 4-32

The experimental protocol for Examples 4-32 is substantially identical to the conditions in the experimental protocol set forth above in Example 3.

Example 4

| Component | Wt % | Mass (in grams) |
|---|---|---|
| Polysulfide sealant - Pro-Seal 870 | 81.2 | 40.6 |
| Sodium bicarbonate | 7.6 | 3.8 |
| Sodium aluminum sulfate | 6.3 | 3.15 |
| Deionized water | 4.9 | 2.45 |

Example 5

| Component | Wt % | Mass (in grams) |
|---|---|---|
| Polysulfide sealant - AC-770 | 79.3 | 39.65 |
| Potassium bicarbonate | 9.3 | 4.65 |
| Delta-gluconolactone | 7.1 | 3.55 |
| Deionized water | 4.3 | 2.15 |

Example 6

| Component | Wt % | Mass (in grams) |
|---|---|---|
| Polysulfide sealant- PR-1428 | 84 | 42 |
| Sodium bicarbonate | 3.7 | 1.85 |
| Sodium aluminum phosphate | 8 | 4 |
| Deionized water | 4.3 | 2.15 |

Example 7

| Component | Wt % | Mass (in grams) |
|---|---|---|
| Polysulfide sealant - Pro Seal 870 | 83.7 | 41.85 |
| Ammonium bicarbonate | 8.7 | 4.35 |
| Delta-gluconolactone | 5 | 2.5 |
| Deionized water | 2.6 | 1.3 |

Example 8

| Component | Wt % | Mass (in grams) |
|---|---|---|
| Polysulfide sealant- PR-1428 | 89.9 | 44.95 |
| Sodium bicarbonate | 3.3 | 1.65 |
| Potassium bitartrate | 3.7 | 1.85 |
| Deionized water | 3.1 | 1.55 |

Example 9

| Component | Wt % | Mass (in grams) |
|---|---|---|
| Polysulfide sealant-PR-1440 | 85.3 | 42.65 |
| Potassium bicarbonate | 2.5 | 1.25 |
| Delta-gluconolactone | 8.9 | 4.45 |
| Deionized water | 3.3 | 1.65 |

Example 10

| Component | Wt % | Mass (in grams) |
|---|---|---|
| Polysulfide sealant - AC-251 | 83.9 | 41.95 |
| Potassium bicarbonate | 7.4 | 3.7 |
| Sodium aluminum phosphate | 7.4 | 3.7 |
| Deionized water | 1.3 | 0.65 |

Example 11

| Component | Wt. % | Mass (in grams) |
|---|---|---|
| Polysulfide sealant-PR-1440 | 82.9 | 41.45 |
| Ammonium bicarbonate | 4.9 | 2.45 |
| Potassium bitartrate | 8.6 | 4.3 |
| Deionized water | 3.6 | 1.8 |

Example 12

| Component | Wt % | Mass (in grams) |
|---|---|---|
| Polysulfide sealant-AC-251 | 83.7 | 41.85 |
| Potassium bicarbonate | 5.2 | 2.6 |
| Monocalcium phosphate | 7.3 | 3.65 |
| Deionized water | 3.8 | 1.9 |

Example 13

| Component | Wt % | Mass (in grams) |
|---|---|---|
| Polysulfide sealant-Pro-Seal 890 | 80.2 | 40.1 |
| Sodium bicarbonate | 9.6 | 4.8 |
| Sodium aluminum sulfate | 8.1 | 4.05 |
| Deionized water | 2.1 | 1.05 |

Example 14

| Component | Wt % | Mass (in grams) |
|---|---|---|
| Polysulfide sealant-PR-1440 | 81.2 | 40.6 |
| Sodium bicarbonate | 5.3 | 2.65 |
| Potassium bitartrate | 10 | 5 |
| Deionized water | 3.5 | 1.75 |

Example 15

| Component | Wt % | Mass (in grams) |
|---|---|---|
| Polysulfide sealant-PR-1428 | 80.5 | 40.25 |
| Potassium bicarbonate | 6.4 | 3.2 |
| Delta-gluconolactone | 9.2 | 4.6 |
| Deionized water | 3.9 | 1.95 |

Example 16

| Component | Wt % | Mass (in grams) |
|---|---|---|
| Polysulfide sealant - PR-1772 | 87.6 | 43.8 |
| Potassium bicarbonate | 4.7 | 2.35 |
| Sodium aluminum sulfate | 5.2 | 2.6 |
| Deionized water | 2.5 | 1.25 |

Example 17

| Component | Wt % | Mass (in grams) |
|---|---|---|
| Polysulfide sealant-AC-251 | 87.1 | 43.55 |
| Potassium bicarbonate | 4.3 | 2.15 |
| Sodium acid pyrophosphate | 3.8 | 1.9 |
| Deionized water | 4.8 | 2.4 |

Example 18

| Component | Wt % | Mass (in grams) |
|---|---|---|
| Polysulfide sealant-Pro-seal 890 | 87.3 | 43.65 |
| Sodium bicarbonate | 5.4 | 2.7 |
| Sodium acid pyrophosphate | 4.3 | 2.15 |
| Deionized water | 3 | 1.5 |

Example 19

| Component | Wt % | Mass (in grams) |
|---|---|---|
| Polysulfide sealant-PR1776-M | 79.53 | 39.75 |
| Sodium bicarbonate | 8.4 | 4.2 |
| Sodium aluminum pyrophosphate | 7.5 | 3.75 |
| Deionized water | 4.6 | 2.3 |

Example 20

| Component | Wt % | Mass (in grams) |
|---|---|---|
| Polysulfide sealant-PR-1440 | 85.3 | 42.65 |
| Sodium bicarbonate | 6.2 | 3.1 |
| Sodium aluminum pyrophosphate | 3.7 | 1.85 |
| Deionized water | 4.8 | 2.4 |

Example 21

| Component | Wt % | Mass (in grams) |
|---|---|---|
| Polysulfide sealant-PR-1772 | 84.7 | 42.35 |
| Potassium bicarbonate | 8.2 | 4.1 |
| Sodium acid pyrophosphate | 4 | 2 |
| Deionized water | 3.1 | 1.55 |

Example 22

| Component | Wt % | Mass (in grams) |
|---|---|---|
| Polysulfide sealant-Pro-seal 890 | 84.4 | 42.2 |
| Potassium bicarbonate | 5.3 | 2.65 |
| Sodium acid pyrophosphate | 5.7 | 2.85 |
| Deionized water | 4.6 | 2.3 |

Example 23

| Component | Wt % | Mass (in grams) |
|---|---|---|
| Polysulfide sealant-Pro-Seal 870 | 82 | 41 |
| Sodium bicarbonate | 5.6 | 2.8 |
| Sodium aluminum pyrophosphate | 8.4 | 4.2 |
| Deionized water | 4 | 2 |

Example 24

| Component | Wt % | Mass (in grams) |
|---|---|---|
| Polysulfide sealant-PR-1772 | 88.3 | 44.15 |
| Ammonium bicarbonate | 6.3 | 3.15 |
| Sodium aluminum sulfate | 4.4 | 2.2 |
| Deionized water | 1 | 0.5 |

Example 25

| Component | Wt % | Mass (in grams) |
|---|---|---|
| Polysulfide sealant-AC-251 | 83.8 | 41.9 |
| Ammonium bicarbonate | 7 | 3.5 |
| Sodium aluminum pyrophosphate | 6.3 | 3.15 |
| Deionized water | 2.9 | 1.45 |

Example 26

| Component | Wt % | Mass (in grams) |
|---|---|---|
| Polysulfide sealant-PR-1776M | 80.21 | 40.1 |
| Sodium bicarbonate | 10 | 5 |
| Monocalcium phosphate | 4.9 | 2.45 |
| Deionized water | 4.9 | 2.45 |

Example 27

| Component | Wt % | Mass (in grams) |
|---|---|---|
| Polysulfide sealant-AC-251 | 82.4 | 41.2 |
| Ammonium bicarbonate | 7.8 | 3.9 |
| Sodium aluminum phosphate | 8.8 | 4.4 |
| Deionized water | 1 | 0.5 |

Example 28

| Component | Wt % | Mass (in grams) |
|---|---|---|
| Polysulfide sealant-PR 1776M | 77.9 | 38.95 |
| Ammonium bicarbonate | 9.8 | 4.9 |
| Sodium aluminum sulfate | 8.2 | 4.1 |
| Deionized water | 4.1 | 2.05 |

Example 29

| Component | Wt % | Mass (in grams) |
|---|---|---|
| Polysulfide sealant-PR-1440 | 88.5 | 44.25 |
| Potassium bicarbonate | 4.5 | 2.25 |
| Sodium aluminum pyrophosphate | 5.5 | 2.75 |
| Deionized water | 1.5 | 0.75 |

Example 30

| Component | Wt % | Mass (in grams) |
|---|---|---|
| Polysulfide sealant-PR-1772 | 83.9 | 41.95 |
| Ammonium bicarbonate | 8 | 4 |
| Sodium acid pyrophosphate | 5 | 2.5 |
| Deionized water | 3.1 | 1.55 |

Example 31

| Component | Wt % | Mass (in grams) |
|---|---|---|
| Polysulfide sealant-AC-251 | 78.8 | 39.4 |
| Sodium bicarbonate | 9.8 | 4.9 |
| Delta-gluconolactone | 9 | 4.5 |
| Deionized water | 2.4 | 1.2 |

Example 32

| Component | Wt % | Mass (in grams) |
|---|---|---|
| Polysulfide sealant-AC-770 | 81.6 | 40.8 |
| Potassium bicarbonate | 7.9 | 3.95 |
| Monocalcium phosphate | 8.9 | 4.45 |
| Deionized water | 1.6 | 0.8 |

According to the present disclosure, though being bound to no particular theory, a polysulfide sealant having improved characteristics in terms of a significantly reduced density (weight savings), low toxicity and higher application rate is achieved when a bicarbonate and an acid salt (e.g. sodium aluminum phosphate and monocalcium bicarbonate, etc.) are reacted with polysulfide sealant formulations, including commercially available polysulfide sealant formulations. The reaction products display significantly improved properties in terms of density reduction, higher application rate as a sealant, and other properties, while limiting the toxicity ordinarily realized during curing and application of typical polysulfide containing sealants.

More specifically, as shown in the Examples, the reduction in density achieved in the resultant sealants according to the present disclosure, recognizes a density reduction over the stock polysulfide sealant of from about 51% to about 56%. Indeed, a density reduction, ranging from about 20% to about 50%, significantly and favorably impacts manufacturing and sealing procedures in many industries including, for example, the manufacture of vehicles, and including, without limitation, the manufacture of automotive vehicles and other terrestrial vehicles, including military terrestrial vehicles such as, for example, tanks, personnel carriers, assault vehicles, etc., surface and sub-surface watercraft, aircraft and spacecraft. Still further, selection of varying components in varying amounts can tailor the density of a resulting sealant formulation to predictably achieve a sealant having a predetermined density. Further contemplated applications include, without limitation, sealing procedures used in connection with stationary objects including buildings, fittings including fittings for water and fuel tanks to be fitted into buildings, as well as trusses, supports for roads, bridges, wind generation devices and the like, etc.

Regarding toxicity, the manufacture and application of the sealing formulations according to the present disclosure predominantly liberates compounds that are significantly less toxic than are realized at present in the sealant industry. Using bicarbonate-containing compounds in the processes of the present disclosure, essentially as blowing agents, increases the safety to workers applying the sealants, especially those workers applying the resulting sealants in confined spaces.

As explained above, the sealant formulations of the present disclosure have a density ranging from about 20% to 56% lower density than the densities of available, or "stock" polysulfide sealants. Therefore, the sealant formulations of the present disclosure further realize advantages of producing stable foam sealants having a significantly lower density that enables a significantly higher application rate. Based on the density-reduction values achieved by the presently disclosed formulation (as compared to the stock polysulfide sealants), it is estimated that the application rate of the presently disclosed polysulfide sealants is up to about 10× faster than the application rate of stock polysulfide sealants. As a result, the increased sealant application rate reduces the amount of time spent in an otherwise time consuming task of working or faring the sealant, and significantly reduces the servicing, manufacturing and inspection time leading to significantly improved manufacturing cycle times for the product being manufactured, and the repair time, all of which lead to a significant cost savings in terms of material cost and labor cost (e.g. application, repair and inspection time and cost, etc.).

In addition, the improved physical and chemical properties of the sealant formulations of the present disclosure enable the formulations to be applied to surfaces in new and advantageous ways, including, for example, spraying, etc. The improved low-density sealants disclosed herein can be used not only as sealants for part interfaces, but can also be used to fill voids, cavities, spaces, etc., where typical sealants could not be used before due to the added weight considerations. The low-density sealants disclosed herein can now serve these space-filling functions, filling cavities, voids or spaces having a volume, for example, ranging up to at least about 10 ft$^3$.

FIGS. 1-7 are flowcharts outlining aspects of the present disclosure. FIG. 1 shows, according to one aspect, a method for making a sealant composition 10 comprising 12 combining a predetermined amount of a polysulfide with a predetermined amount of acid salt and a predetermined amount of bicarbonate to form a first mixture, 14 adding a predetermined amount of aqueous media to the first mixture to form a second mixture, and 16 curing the second mixture.

Figure 2:
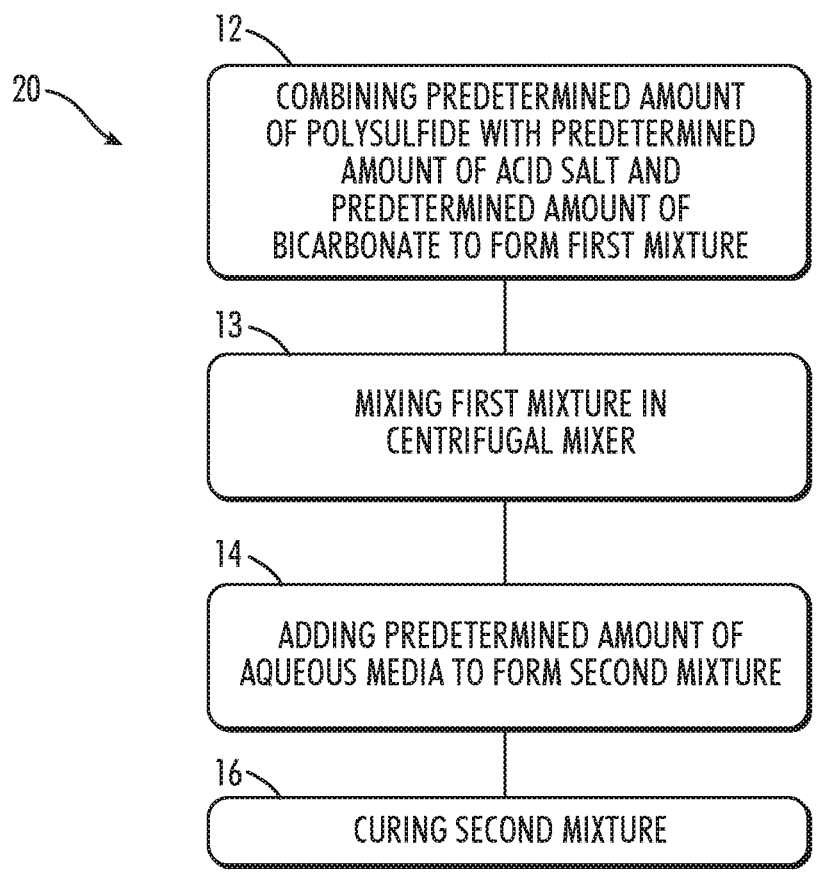

FIG. 2 shows a method 20 for making a sealant composition, comprising 12 combining a predetermined amount of a polysulfide with a predetermined amount of acid salt and a predetermined amount of bicarbonate to form a first mixture, 13 mixing the first mixture in a centrifugal mixer, 14 adding a predetermined amount of aqueous media to form a second mixture, and 16 curing the second mixture. The aspects shown in FIG. 1 are understood as being incorporated into the methods shown in FIG. 2.

Figure 3:
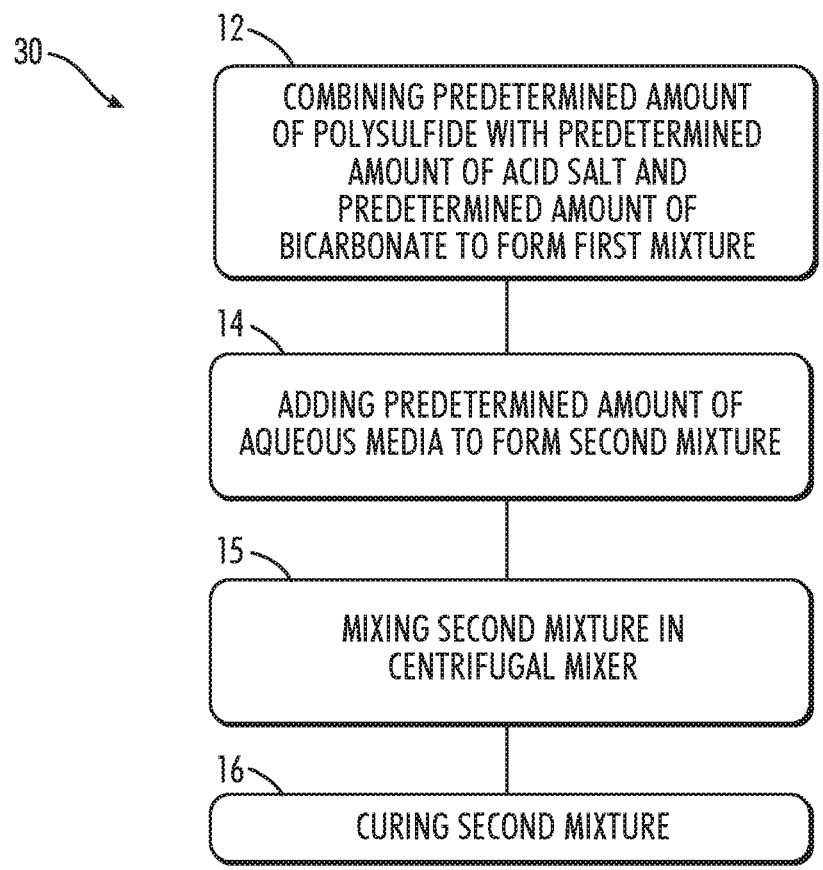

FIG. 3 shows a method 30 for making a sealant composition, comprising 12 combining a predetermined amount of a polysulfide with a predetermined amount of acid salt and a predetermined amount of bicarbonate to form a first mixture, 14 adding a predetermined amount of aqueous media, 15 mixing the second mixture in a centrifugal mixer, and 16 curing the second mixture. The aspects shown in FIGS. 1 and 2 are able to be incorporated into the methods shown in FIG. 3.

Figure 4:
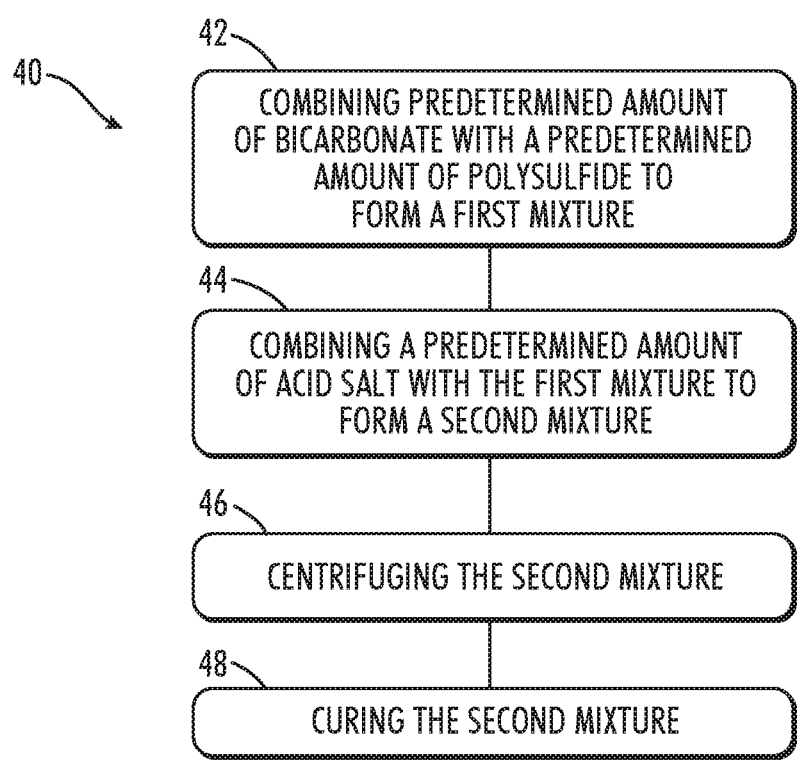

FIG. 4 shows a method 40 for making a sealant composition comprising, 42 combining a predetermined amount of bicarbonate with a predetermined amount of polysulfide to form a first mixture, 44 combining a predetermined amount of acid salt with the first mixture to form a second mixture, 46 centrifuging the second mixture, and 48 curing the second mixture. The aspects shown in FIGS. 1-3 are able to be incorporated into the methods shown in FIG. 4.

Figure 5:
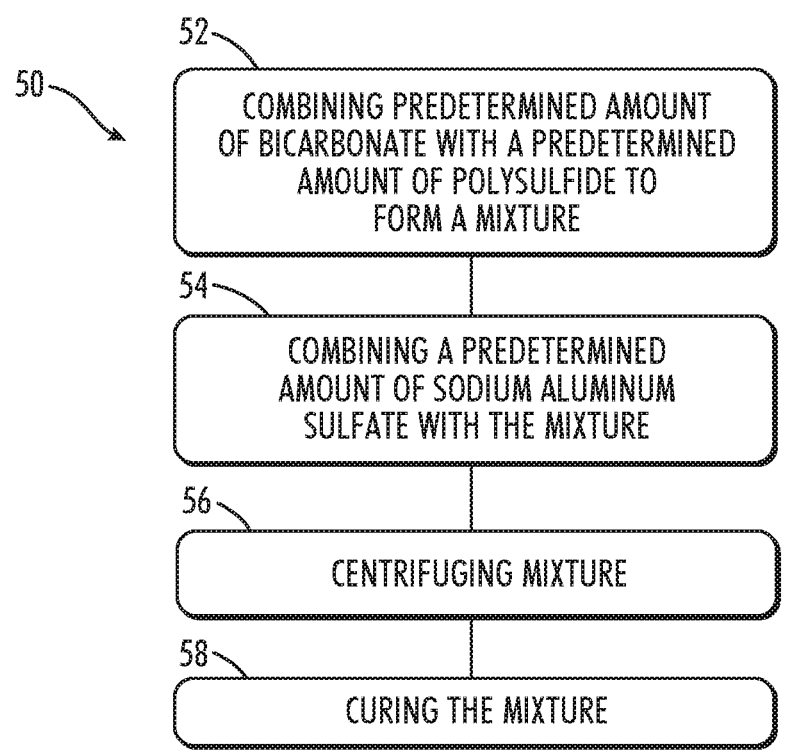

FIG. 5 shows a method 50 for making a sealant composition comprising 52 combining a predetermined amount of bicarbonate with a predetermined amount of polysulfide to form a mixture, 54 combining a predetermined amount of sodium aluminum sulfate with the mixture, 56 centrifuging the mixture, and 68 curing the mixture. The aspects shown in FIGS. 1-4 are able to be incorporated into the methods shown in FIG. 5.

Figure 6:
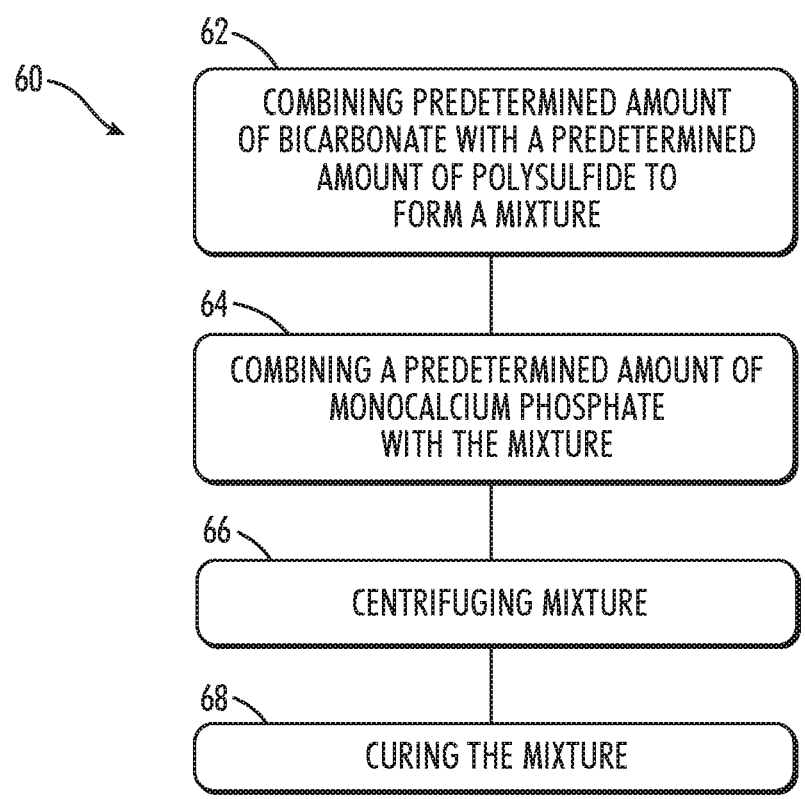

FIG. 6 shows a method 60 for making a sealant composition comprising 62 combining a predetermined amount of bicarbonate with a predetermined amount of polysulfide to form a mixture, 64 combining a predetermined amount of monocalcium phosphate with the mixture, 66 centrifuging the mixture, and 68 curing the mixture. The aspects shown in FIGS. 1-5 are able to be incorporated into FIG. 6.

Variations and alternatives of the present disclosure relate to the manufacture and use of low-density polysulfide-containing sealants used in the manufacture of components and parts such as, for example, component and parts of any dimension, including the manufacture and use of components and parts used in the fabrication of larger parts and structures. Such components and parts include, but are not limited to, components and parts designed to be positioned on the exterior or interior of stationary objects including, without limitation, bridge trusses, support columns, general construction objects, buildings, etc. Further components and parts include, without limitation, components and parts used in the manufacture of non-stationary objects including, without limitation, all vehicle types including, without limitation, atmospheric and aerospace vehicles and other objects, and structures designed for use in space or other upper-atmosphere environments such as, for example, manned or unmanned vehicles and objects. Contemplated objects include, but are not limited to vehicles such as, for example, aircraft, spacecraft, satellites, rockets, missiles, etc. and therefore include manned and unmanned aircraft, manned and unmanned spacecraft, manned and unmanned terrestrial vehicles, manned and unmanned non-terrestrial vehicles, and even manned and unmanned surface and manned and unmanned sub-surface water-borne vehicles and objects.

When introducing elements of the present disclosure or exemplary aspects thereof, the articles "a," "an," "the" and "said" are intended to mean that there are one or more of the elements. The terms "comprising," "including" and "having" are intended to be inclusive and mean that there may be additional elements other than the listed elements. Although this disclosure has been described with respect to specific aspects, the details of these aspects are not to be construed as limitations. While the preferred variations and alternatives of the present disclosure have been illustrated and described, it will be appreciated that various changes and substitutions can be made therein without departing from the spirit and scope of the disclosure.

What is claimed is:

1. A sealant formulation comprising:
   a polysulfide in an amount ranging from about 75 to about 90 weight %;
   an acid salt in an amount ranging from about 3 to about 10 weight %; and
   a bicarbonate in an amount ranging from about 2.5 to about 10 weight %.

2. The sealant formulation of claim 1, wherein the acid salt comprises at least one of:
   sodium aluminum sulfate; monocalcium phosphate; delta-gluconolactone; sodium acid pyrophosphate; sodium aluminum phosphate; sodium aluminum pyrophosphate; or potassium bitartrate.

3. The sealant formulation of claim 1, wherein the bicarbonate comprises at least one of:
   sodium bicarbonate; potassium bicarbonate; or ammonium bicarbonate.

4. The sealant formulation of claim 1, wherein the polysulfide comprises at least one of:
   a polymer comprising one or more disulfide linkages and the polysulfide ranges in molecular weight from about 1100 to about 8000, said polymer comprising a cross-linking density of from about 0.2 to about 5 mol %.

5. The sealant formulation of claim 1, wherein the polysulfide comprises at least one of:
   polysulfide polymers made from monomers comprising: 1,3-dichloropropane; 1,3-dibromopropane; 1,2-dichloropropane; 1,4-dichlorobutane; 1,4-dibromobutane; trans-1,4-dibromo-2-butene; 1,3-dichlorobutane; 1,2-dichlorobutane; 1,2-dibromobutane; 2,3-dichlorobutane; 2,3-dibromobutane; 1,5-dichloropentane; 1,5-dibromopentane; 1,4-dichloropentane; 1,4-dibromopentane; 1,3-dichloropentane; 1,2-dichloropentane; 2,3-dichloropentane; 2,4-dichloropentane; 1,6-dichlorohexane; 1,6-dibromohexane; 1,2-dichlorohexane; 1,2-dichlorocyclohexane; 1,2-dichlorocyclohexane cis and trans isomers; 1,3-dichlorocyclohexane; 1,3-dichlorocyclohexane cis and trans isomers; 1,4-dichlorocyclohexane; 1,4-dichlorocyclohexane cis and trans isomers; 1,2-bis(chloromethyl)cyclohexane; 1,2-bis(chloromethyl)cyclohexane cis and trans isomers; 1,I-bis(chloromethyl)cyclo-hexane; 1,I-bis(chloromethyl)cyclohexane cis and trans isomers; 1,4-bis(chloromethyl)cyclohexane; 1,4-bis(chloromethyl)cyclohexane cis and trans isomers; 1,2-bis(chloromethyl)benzene; 1,2,3-trichloropropane; 1,2,3-tribromopropane; ethane,1,1'-thiobis[2-[(2-chloroethyl)thio]-; ethane,1,1'-oxybis[2-chloro]-; sodium sulfide; sodium polysulfide; elemental sulfur or combinations thereof.

6. The sealant formulation of claim 1 comprising:
   a polysulfide;
   sodium aluminum sulfate or monocalcium phosphate; and sodium bicarbonate.

7. A cured sealant made from the sealant formulation of claim 1, wherein the cured sealant has a density ranging from about 0.6 g/cm$^3$ to about 1.0 g/cm$^3$.

8. The sealant formulation of claim 1, further comprising:
   an aqueous media in an amount ranging from about 1 to about 5 weight %.

9. A component comprising a cured sealant made from the sealant formulation of claim 8.

10. A vehicle comprising the component of claim 9.

11. A method of manufacturing a polysulfide-containing sealant formulation comprising:
    a polysulfide in an amount ranging from about 75 to about 90 weight %; an acid salt in an amount ranging from about 3 to about 10 weight %; and a bicarbonate in an amount ranging from about 2.5 to about 10 weight %, to form a first mixture.

12. The method of claim 11, wherein, the step of combining a polysulfide with an acid salt and a bicarbonate to form a first mixture, the acid salt comprising at least one of:
    sodium aluminum sulfate; monocalcium phosphate; delta-gluconolactone; sodium acid pyrophosphate; sodium aluminum phosphate; sodium aluminum pyrophosphate; or potassium bitartrate.

13. The method of claim 11, wherein, the step of combining a polysulfide with an acid salt and a bicarbonate to form a first mixture, the bicarbonate comprising at least one of:
    sodium bicarbonate; potassium bicarbonate; or ammonium bicarbonate.

14. The method of claim 11, wherein, the step of combining a polysulfide with an acid salt and a bicarbonate to form a first mixture, the polysulfide comprising at least one of:
    polysulfide polymers made from monomers comprising at least one of: 1,3-dichloropropane; 1,3-dibromopropane; 1,2-dichloropropane; 1,4-dichlorobutane; 1,4-dibromobutane; trans-1,4-dibromo-2-butene; 1,3-dichlorobutane; 1,2-dichlorobutane; 1,2-dibromobutane; 2,3-dichlorobutane; 2,3-dibromobutane; 1,5-dichloropentane; 1,5-dibromopentane; 1,4-dichloropentane; 1,4-dibromopentane; 1,3-dichloropentane; 1,2-dichloropentane; 2,3-dichloropentane; 2,4-dichloropentane; 1,6-dichlorohexane; 1,6-dibromohexane; 1,2-dichlorohexane; 1,2-dichlorocyclohexane; 1,2-dichlorocyclohexane cis and trans isomers; 1,3-dichlorocyclohexane; 1,3-dichlorocyclohexane cis and trans isomers; 1,4-dichlorocyclohexane; 1,4-dichlorocyclohexane cis and trans isomers; 1,2-bis(chloromethyl)cyclohexane; 1,2-bis(chloromethyl)cyclohexane cis and trans isomers; 1,1-bis(chloromethyl)cyclo-hexane; 1,1-bis(chloromethyl)cyclohexane cis and trans isomers; 1,4-bis(chloromethyl)cyclohexane; 1,4-bis(chloromethyl)cyclo-hexane cis and trans isomers; 1,2-bis(chloromethyl)benzene; 1,2,3-trichloropropane; 1,2,3-tribromopropane; ethane,1,1'-thiobis[2-[(2-chloroethyl)thio]-; ethane,1,1'-oxybis[2-chloro]-; sodium sulfide; sodium polysulfide; elemental sulfur or combinations thereof.

15. The method of claim 11, wherein, in the step of combining a polysulfide with an acid salt and a bicarbonate to form a first mixture, the polysulfide is present in an amount ranging from about 75 to about 90 weight %, the acid salt is present in an amount ranging from about 3 to about 10 weight %, the bicarbonate is present in an amount ranging from about 2.5 to about 10 weight %.

16. The method of claim 11, further comprising the step of:
adding an aqueous media to the first mixture to form a second mixture in an amount of from about 1 to about 5 weight %.

17. The method of claim 11, after the step of combining a polysulfide with an acid salt and a bicarbonate to form a first mixture, further comprising the step of:
mixing the first mixture in a centrifugal mixer at predetermined and varying RPMs for predetermined durations.

18. The method of claim 17, after the step of adding an aqueous media to the first mixture to form a second mixture, further comprising the step of:
mixing the second mixture in a centrifugal mixer at predetermined and varying RPMs for predetermined durations.

19. The method of claim 18, further comprising the step of:
curing the second mixture.

20. The method of claim 19, wherein, in the step of curing the second mixture, the curing is conducted at a temperature ranging from about 120° F. to about 145° F. for a duration of about 12 hours.

21. The method of claim 19, wherein, in the step of curing the second mixture, the curing is conducted at a temperature ranging from about 70° F. to about 100° F.

22. The sealant formulation of claim 1, wherein the sealant formulation cures to form sealant having a density ranging from about 0.6 g/cm$^3$ to about 1.0 g/cm$^3$.

* * * * *